(12) United States Patent
Bell (10) Patent No.: US 8,085,928 B2
(45) Date of Patent: Dec. 27, 2011

(54) ISOLATING AN INACTIVE CABLE PAIR FROM A BRIDGED ACTIVE CABLE PAIR

(75) Inventor: Charles Bell, Holly Hill, FL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1166 days.

(21) Appl. No.: 11/837,083

(22) Filed: Aug. 10, 2007

(65) Prior Publication Data

US 2009/0039863 A1 Feb. 12, 2009

(51) Int. Cl.
*H04M 3/00* (2006.01)
*H04M 5/00* (2006.01)

(52) U.S. Cl. ........................................... 379/326

(58) Field of Classification Search ............... 379/326
See application file for complete search history.

(56) References Cited

U.S. PATENT DOCUMENTS

| | | | | |
|---|---|---|---|---|
| 4,371,756 A | * | 2/1983 | Fasano | 379/177 |
| 4,694,488 A | * | 9/1987 | Mickelson et al. | 379/327 |
| 6,438,226 B1 | * | 8/2002 | Guenther et al. | 379/413.04 |

* cited by examiner

*Primary Examiner* — Alexander Jamal
(74) *Attorney, Agent, or Firm* — Hope Baldauff Hartman, LLC (57) ABSTRACT

Apparatus and methods provide for the isolation of an inactive cable pair from a bridged active cable pair. According to various embodiments, a bridge lifting block is installed in-line between control equipment and a cable connected to the bridged cable pairs. The bridge lifting block includes a first set of post pairs for connection to the control equipment and a second set of post pairs for connection to the cable block. Mini-bridge lifters are installed in the bridge lifting block between the sets of post pairs. The bridge lifting block may include two cable blocks linked together, with mini-bridge lifters installed in one and corresponding pass-through coils installed in the other. Alternatively, the bridge lifting block may include a single block body having two opposing sets of post pairs with intervening mini-bridge lifters. Additional control equipment may be installed between the bridge lifting block and cable block.

12 Claims, 7 Drawing Sheets

ISOLATING AN INACTIVE CABLE PAIR FROM A BRIDGED ACTIVE CABLE PAIR

TECHNICAL FIELD

This application relates generally to the field of telecommunications. More specifically, the disclosure provided herein relates to isolating bridged telecommunications cable pairs.

BACKGROUND

In a telecommunications system, voice and data are transmitted and received via cable pairs between telecommunications devices and a central office (CO) or other location containing the switches and other office equipment that enable the communications. The office equipment that performs the required telecommunications functions to enable communications is connected to the cable pairs via a cable block. The cable block is a device with multiple connectors for accepting multiple cable pairs and for attaching jumpers that connect the cable block and corresponding cable pairs to the office equipment. The cable block additionally provides over-voltage protection to the office equipment through the use of various protection coils installed within the cable block. Typically, the cable block is soldered or otherwise permanently connected to the cable pairs on a rear side, and then connected to the office equipment via jumpers that are connected to a front side of the cable block via wrap-on connections. In this manner, the jumpers may be removed, added, or otherwise manipulated without requiring soldering or other permanent connections to be made or broken.

Typically, the signal quality associated with a telecommunications cable degrades as the cable extends in length. In situations where a customer receives dual service in which telephones at two different locations share a telephone number and service, the corresponding two sets of cable pairs are bridged together at the CO. However, the signal quality of each cable pair corresponds to the combined length of both of the bridged cable pairs unless the active cable pair that is in use is isolated from the inactive cable pair. A bridge lifting device isolates the active cable pair from any other bridged cable pairs. For example, if a business telephone is bridged to a home telephone so that the business telephone rings simultaneously at the business and the home, then when the telephone at the business is answered, the bridged cable pair extending from the CO to the home is isolated using a bridge lifting device to maintain the quality of the business call.

There are two common types of bridge lifting devices, a bridge lifter and a mini-bridge lifter. The type of bridge lifting device used depends on the type of cable block being used. For the purposes of this disclosure, the types of cable blocks will be grouped into two types, legacy cable blocks and current cable blocks. The legacy cable blocks require separate bridge lifters placed in-line between the office equipment and the cable block. The separate bridge lifters include all of the necessary circuitry and/or components for isolating an inactive bridged cable pair from an active bridged cable pair. However, separate bridge lifters require an excessive amount of installation space and require soldering when adding, removing, or otherwise modifying connections to jumpers that electrically link the bridge lifter to the office equipment and to the cable block.

In contrast, the current cable blocks include a number of receptacles for receiving the mini-bridge lifters, which include the necessary circuitry and/or components for isolating inactive cable pairs, but are configured as plugs that may be installed within the cable block in a position corresponding to the cable pair to which it is attached. However, using the current cable blocks and mini-bridge lifters, equipment may not be added between the mini-bridge lifters and the corresponding bridged cable pairs. The mini-bridge lifters are installed within the cable block, between the cable block connections to the cable pairs and the cable block connections to the jumpers that electrically link the cable block to the office equipment, without means for adding jumpers from the mini-bridge lifter to additional equipment that requires placement between the mini-bridge lifter and the cable pairs, such as Asymmetric Digital Subscriber Line (ADSL) control equipment, and back to the applicable cable pairs.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Apparatus and methods are provided herein for isolating an inactive cable pair from a bridged active cable pair. According to embodiments described herein, a bridge apparatus includes two post pairs. The first post pair is used for connection to control equipment via a jumper. The second post pair is used for connection to a cable block directly connected to the bridged cable pairs via another jumper. The bridge apparatus further includes a mini-bridge lifter that is operative to isolate the inactive cable pair from the active cable pair. The two post pairs are electrically connected through the mini-bridge lifter via an electrical conductor.

According to various embodiments, the bridge apparatus may include two linked cable blocks that are electrically connected. One of the linked cable blocks is connected to the office equipment. This linked cable block includes one or more installed mini-bridge lifters. The other linked cable block is connected to the cable block that is directly attached to the bridged cable pairs. This linked cable block includes one or more pass-through coils corresponding to the one or more mini-bridge lifters. Alternatively, the bridge apparatus may include a single block body rather than two linked cable blocks. The single block body includes two post pairs that are electrically linked via the mini-bridge lifter. One post pair allows for connection to the control equipment, while the other post pair allows for connection to the cable block.

According to other embodiments described herein, a method provides for electrically connecting one or more cable pairs to telecommunications control equipment in a manner that provides for cable pair isolation capability. The method includes connecting a bridge lifting block to the telecommunications control equipment via a set of jumpers. The bridge lifting block includes any number of mini-bridge lifters. The bridge lifting block is connected via another set of jumpers to a cable block that is directly connected to the cable pairs. According to various embodiments, the bridge lifting block may include two linked cable blocks or may be constructed from a single block body. Further embodiments include attaching ADSL control equipment in line between the bridge lifting block and the cable block in order to provide ADSL services to corresponding bridged cable pairs.

Other embodiments described herein provide for a cable pair isolation apparatus that isolates one or more bridged cable pairs that are connected to control equipment via a cable block. The apparatus includes two sets of post pairs that allow for wrap-on connections of jumpers to the associated control equipment or cable block. The apparatus also includes means for electrically connecting the sets of post pairs through at least one mini-bridge lifter. According to embodiments described herein, the connection means for electrically connecting the two sets of post pairs through the mini-bridge lifter includes using two electrically connected cable blocks.

Other apparatus, systems, and methods according to embodiments will be or become apparent to one with skill in the art upon review of the following drawings and Detailed Description. It is intended that all such additional apparatus, systems, and/or methods be included within this description, be within the scope of the present invention, and be protected by the accompanying claims.

BRIEF DESCRIPTION OF THE DRAWINGS

FIG. 2B is a side view of a protection coil for use with the legacy cable block of FIG. 2A according to various embodiments presented herein;

DETAILED DESCRIPTION

The following detailed description is directed to apparatus and methods for isolating an inactive cable pair from a bridged active cable pair. As discussed briefly above, the telecommunications industry utilizes bridge lifters and mini-bridge lifters to isolate an inactive bridged cable pair from an active bridged cable pair when an off-hook detection is received with respect to the active cable pair. However, legacy cable blocks require bridge lifters that are larger and more cumbersome than mini-bridge lifters and increase the amount of work required by technicians when adding and removing jumpers since the bridge lifters utilize solder connections rather than wrap-on connections. Similarly, current cable blocks, while allowing for the use of mini-bridge lifters, do not allow for the use of any equipment in-line between the mini-bridge lifters and the cable pairs since the mini-bridge lifters are installed within the current cable block to which the cable pairs are connected.

Embodiments of the present disclosure provide a bridge lifting block that is smaller in size than the legacy bridge lifters and may be externally connected to either a legacy cable block or a current cable block in a manner that allows for the use of additional office equipment between the bridge lifting block and the corresponding cable block. In the following detailed description, references are made to the accompanying drawings that form a part hereof, and which are shown by way of illustration specific embodiments or examples. Referring now to the drawings, in which like numerals represent like elements through the several figures, aspects of a cable pair isolation system according to various embodiments will be described.

Figure 1:
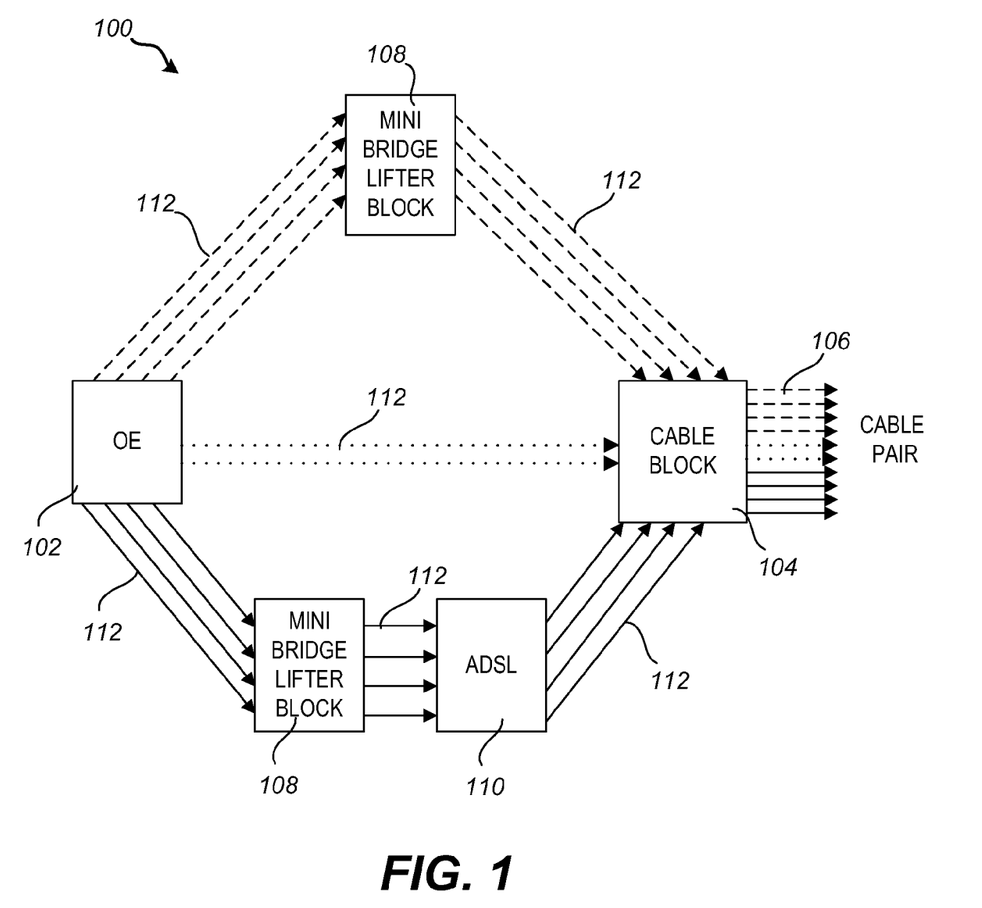
FIG. 1 is a block diagram illustrating a cable pair isolation system according to various embodiments presented herein.

FIG. 1 shows a cable pair isolation system 100 according to various embodiments described herein. The cable pair isolation system 100 may include office equipment 102, a cable block 104, cable pairs 106, a mini-bridge lifter block 108, ADSL equipment 110, and jumpers 112. As mentioned above, the office equipment 102, or control equipment, may include telecommunications switches and any other equipment that enables or facilitates communications using the cable pairs 106. The cable block 104 may be a legacy cable block 104A or a current cable block 104B. The legacy cable block 104A and the current cable block 104B will be discussed in greater detail below with respect to FIGS. 2A and 3. The cable pairs 106 each include a ring lead and a tip lead as is known in the telecommunications field.

The dotted arrows extending from the office equipment 102 to the cable block 104 represent jumpers 112 connecting one or more cable pairs 106 directly to the office equipment 102 without the use of mini-bridge lifter block 108. The jumpers 112 are pairs of wires used to connect cable pairs 106 to other elements of the cable pair isolation system 100. The direct connection of the office equipment 102 to the cable block 104, as represented by the dotted arrows, is satisfactory under circumstances in which the cable block 104 is a legacy cable block 104A and bridge isolation is not required, and in which the cable block 104 is a current cable block 104B and ADSL control equipment 110 is not desired.

The top half of the cable pair isolation system 100 in which the jumpers 112 are depicted in FIG. 1 as dashed arrows illustrates the connections between the cable block 104 and the office equipment 102 utilizing the mini-bridge lifter block 108 to provide cable pair isolation capabilities according to the disclosure provided herein. By connecting the mini-bridge lifter block 108 in-line between the office equipment 102 and the cable block 104 as shown by the dashed arrows, cable pair isolation capabilities are provided when the cable block 104 is a legacy cable block 104A, without having to use a cumbersome legacy bridge lifter that requires soldering the jumpers 112 to the connections on the bridge lifter. Details of the mini-bridge lifter block 108 according to various embodiments will be described below with respect to FIGS. 5-7.

The lower half of the cable pair isolation system 100 in which the jumpers 112 are depicted in FIG. 1 as solid arrows illustrates the connections between the cable block 104 and the office equipment 102 utilizing the mini-bridge lifter block 108 when ADSL service on each of the bridged cable pairs 106 is desired. In order to provide ADSL service simultaneously on bridged cable pairs, the required ADSL control equipment 110 must be connected to the cable pair isolation system 100 in-line between the mini-bridge lifter block 108 and the cable block 104. To place the ADSL control equipment 110 between the office equipment 102 and the mini-bridge lifter block 108 would interrupt ADSL service to any isolated cable pairs. It should be appreciated that the embodiments described herein with respect to placing equipment in-line between the mini-bridge lifter block 108 and the cable block 104 are not limited to ADSL control equipment 110. Rather, the connections represented in FIG. 1 by the solid arrows are equally applicable to any equipment that would benefit from placement between the mini-bridge lifter block 108 and the cable block 104.

Figure 2A:
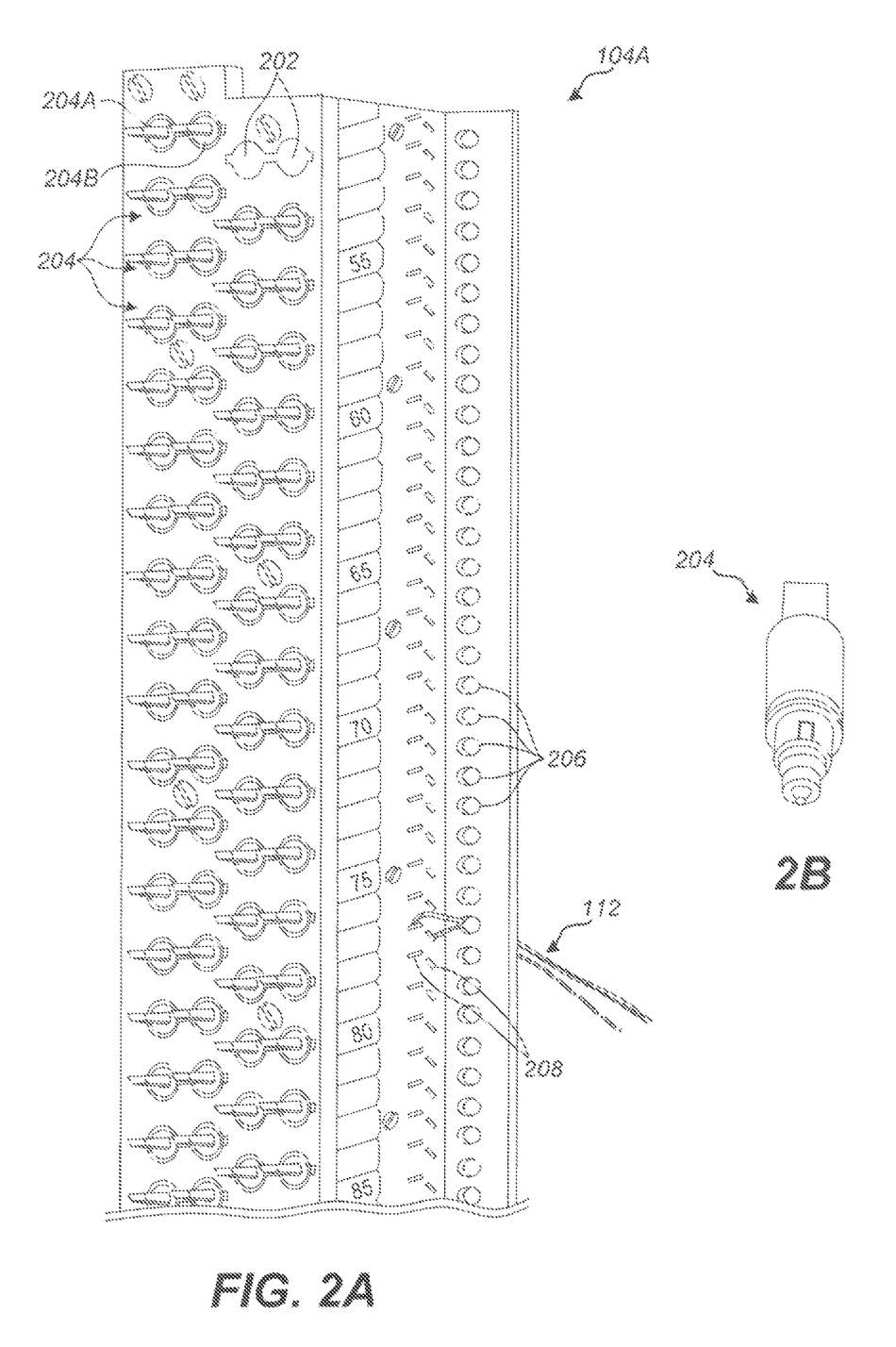
FIG. 2A is a perspective view of a legacy cable block showing installed ring and tip protection coils and jumper solder points according to various embodiments presented herein.

Turning now to FIG. 2A, the legacy cable block 104A according to one embodiment will be described. The legacy cable block 104A may include any number of coil receptacles 202. The coil receptacles 202 are for receiving legacy protection coils 204. The legacy protection coils 204 provide protection to the office equipment 102 from over-voltages by shorting to ground and opening on the CO side when an over-voltage situation is detected. In the legacy cable block 104A (not shown), there are two legacy protection coils 204A and 204B for every cable pair, which correspond to the tip and ring wires, respectively. FIG. 2B shows a typical legacy protection coil 204.

The legacy cable block 104A further includes a number of jumper apertures 206 through which the jumpers 112 may be threaded to be connected to the corresponding solder points 208. The legacy cable block 104A is connected to the cable pairs 106 on the rear side of the legacy cable block 104A. The legacy cable block 104A may be a WECO 300 model cable block from WESTERN ELECTRIC COMPANY, INC., or any other cable block 104 that receives the legacy protection coils 204, or that is not configured to receive mini-bridge lifters.

Figure 3:
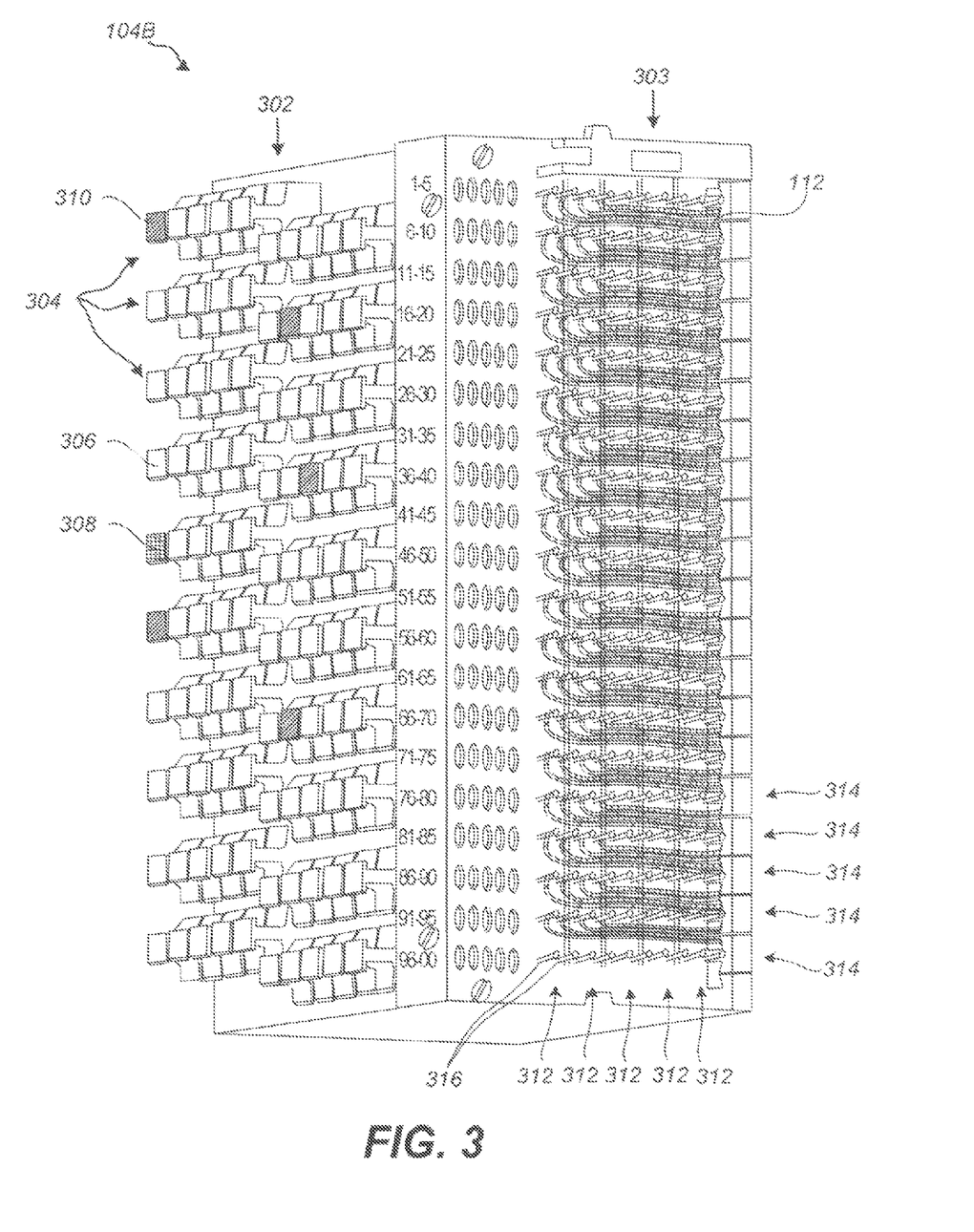
FIG. 3 is a perspective view of a current cable block showing installed protection coils, pass-through coils, and mini-bridge lifters, as well as corresponding post pairs for wrap-on connections to jumpers according to various embodiments presented herein.

FIG. 3 shows a current cable block 104B. The current cable block 104B includes a coil section 302 and a jumper section 303. The coil section 302 is configured in rows of coil receptacles for receiving coils 304 corresponding to the jumpers 112 connected to post pairs 316 in the jumper section 303. There are three basic types of coils 304 that may be installed within a coil receptacle of the current cable block 104B. A protection coil 306 performs a similar function as the legacy protection coils 204 described above, protecting the office equipment 102 from over-voltages. However, the current cable block 104B only requires a single protection coil 306 for a ring and tip wire pair, whereas the legacy cable block 104A requires a legacy protection coil 204 for each ring wire and tip wire.

Figure 4:
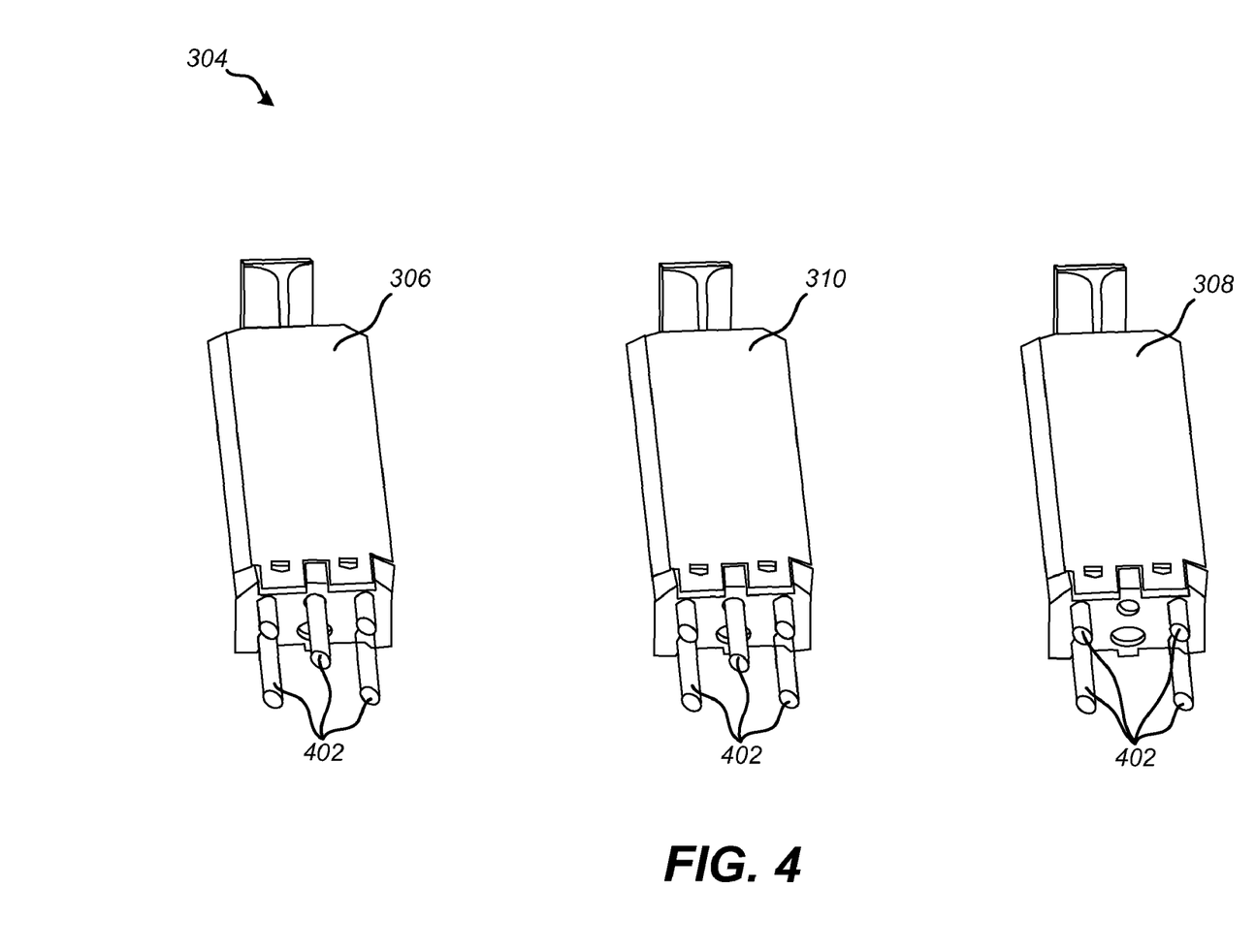
FIG. 4 is a perspective view of a protection coil, a mini-bridge lifter, and a pass-through coil according to various embodiments presented herein.

Non-protection coils, or pass-through coils 308, provide an electrical path from the corresponding cable pair 106 directly through the current cable block 104B to the corresponding jumpers 112, without any protective circuitry or other intervening components. The pass-through coils 308 are used in situations where protective coils are not needed. Mini-bridge lifters 310 contain all of the necessary circuitry and components to isolate an inactive cable pair 106 from an active bridged cable pair 106. All of the coils 304 are configured according to similar exterior dimensions to allow any of the coils 304 to be installed into any of the coil receptacles in the coil section 302 of the current cable block 104B. FIG. 4 shows examples of the protection coil 306, the pass-through coil 308, and the mini-bridge lifter 310. Each of the coils 304 utilizes some known combination of connector pins 402 configured to mate with corresponding coil receptacle connectors located in a bottom portion of the coil receptacles.

It should be appreciated that the embodiments described herein are not limited to the configurations of the coils 304 shown in FIG. 4. For example, the mini-bridge lifter 310 may be any device that contains circuitry and/or components to provide cable pair isolation functionality and that is configured for installation into a cable block 104 in a position to interrupt the electrical signal between a cable pair connection and a corresponding jumper connection, regardless of the shape, size, or connector pin 402 configuration of the mini-bridge lifter 310.

Returning to FIG. 3, the jumper section 303 of the current cable block 104B includes pin columns 312 and pin rows 314. There are five pin columns 312 corresponding to the five post pair 316 in each pin row 314. It should be understood that any number of pin columns 312 and pin rows 314 may be included with the current cable block 104B without departing from the scope of this disclosure. As described above, a benefit of the current cable block 104B when compared to the legacy cable block 104A is that the jumpers 112 connect to the current cable block 104B via wrap-on connections to the post pairs 316 rather than via solder connections. In other words, to add jumpers 112 to a current cable block 104B, the technician wraps the ends of the tip and ring wires to the applicable post pairs 316. To do the same job with a legacy cable block 104A, the technician must solder the jumpers to the solder points 208. It should be appreciated that the current cable block 104B may be a WECO 303 model cable block, WECO 305 model cable block, a WECO 307 model cable block, or a WECO 310 model cable block from WESTERN ELECTRIC COMPANY, INC., or any other cable block 104 that receives the mini-bridge lifters 310.

Figure 5:
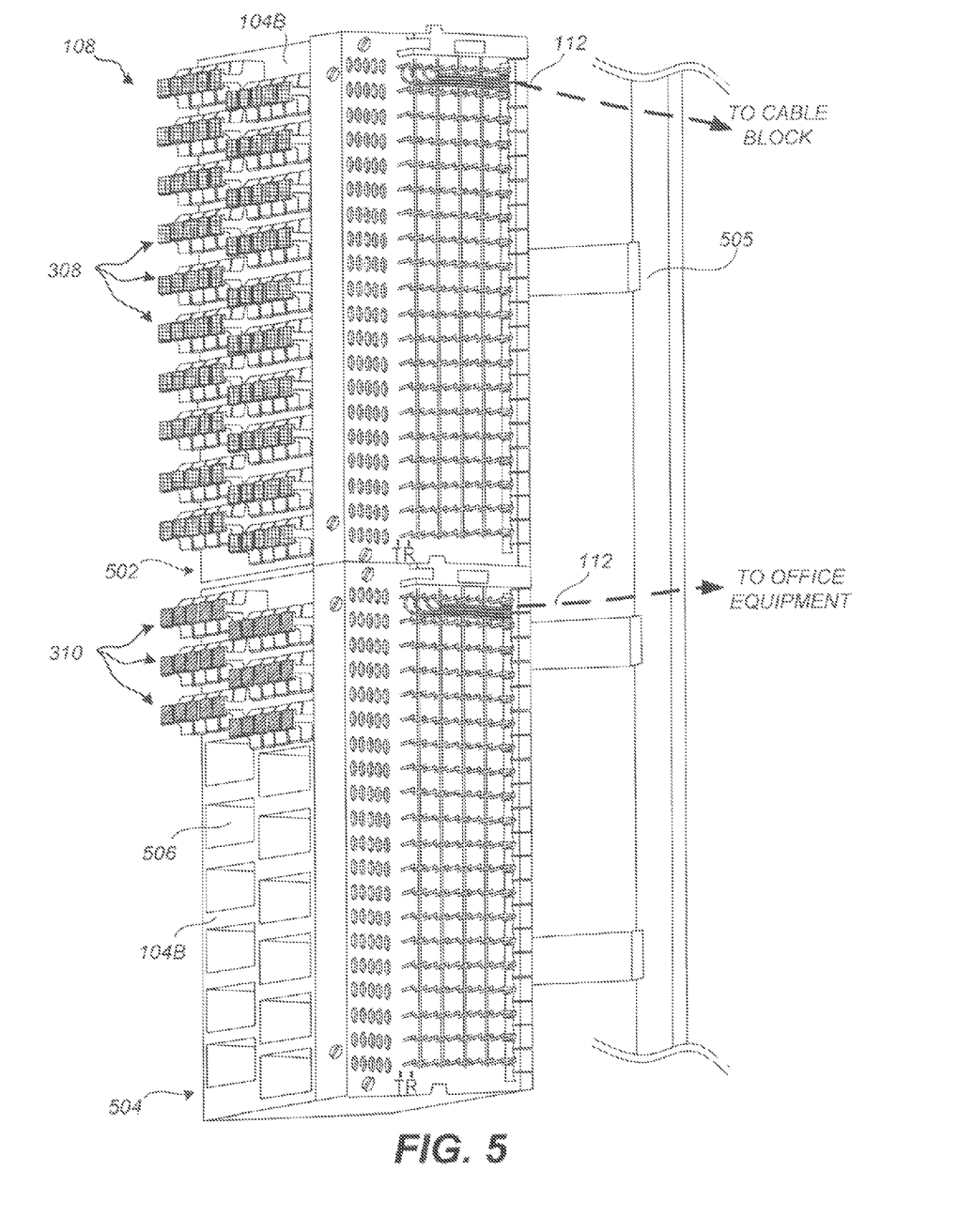
FIG. 5 is a perspective view of a mini-bridge lifter block showing an equipment-side cable block and a field-side cable block according to various embodiments presented herein.

Turning now to FIG. 5, the mini-bridge lifter block 108 according to one embodiment will be described. The mini-bridge lifter block 108 is made up of two current cable blocks 104B that are electrically connected to one another on a rear side utilizing connectors normally used to connect the cable pairs 106 to the current cable block 104B. In the embodiment shown in FIG. 5, the mini-bridge lifter block 108 is mounted to a frame 505. The top current cable block 104B is referred to herein as the field-side cable block 502. The field-side cable block 502 provides the connections to the cable block 104. The bottom current cable block 104B is referred to herein as the equipment-side cable block 504. The equipment-side cable block 504 provides the connections to the office equipment 102. The equipment-side cable block 504 contains only mini-bridge lifters 310 in the coil receptacles 506.

It should be appreciated that the number of mini-bridge lifters 310 installed into the equipment-side cable block 504 need only to correspond with the number of jumpers 112 tied down to the pairs of posts 316. However, a surplus of mini-bridge lifters 310 may be installed into the coil receptacles 506 of the equipment-side cable block 504 as shown in FIG. 5 to reduce the number of steps required by a technician adding jumpers 112 to the mini-bridge lifter block 108 in the future. The field-side cable block 502 contains only pass-through coils 308 in the coil receptacles 506. By doing so, electrical signals may pass through the mini-bridge lifter block 108 between the post pairs 316 of the field-side cable block 502 and the post pairs 316 of the equipment-side cable block 504 and through the mini-bridge lifters 310. Similar to the mini-bridge lifters 310 in the equipment-side cable block 504, the field-side cable block 502 may contain a surplus of installed pass-through coils 308 to increase the efficiency of a technician installing jumpers 112 to the mini-bridge lifter block 108. It should be noted that protection coils 306 are not required for the mini-bridge lifter block 108 since the protection coils 306 are installed into the cable block 104 that is connected directly to the cable pairs 106.

It should be understood that the passage of an electrical signal through the mini-bridge lifter block 108 and an intervening mini-bridge lifter 310 is similar to the passage of an electrical signal through the current cable block 104B when connected to a cable pair 106 with a corresponding mini-bridge lifter 310 installed. However, by electrically linking two current cable blocks 104B using the rear connectors normally reserved for the cable pairs 106, the mini-bridge lifter block 108 is created, allowing a technician to utilize wrap-on connections to the post pairs 316 on both sides of the mini-bridge lifter block 108, or specifically, on the field-side cable block 502 and on the equipment-side cable block 504. As stated above, the wrap-on connections save time when compared to the solder connections required by the cable pair 106 connections on the rear of the current cable block 104B. Additionally, the resulting mini-bridge lifter block 108 may be installed in-line between the office equipment 102 and the cable block 104 for use with a legacy cable block 104A or with ADSL control equipment 110.

Figure 6:
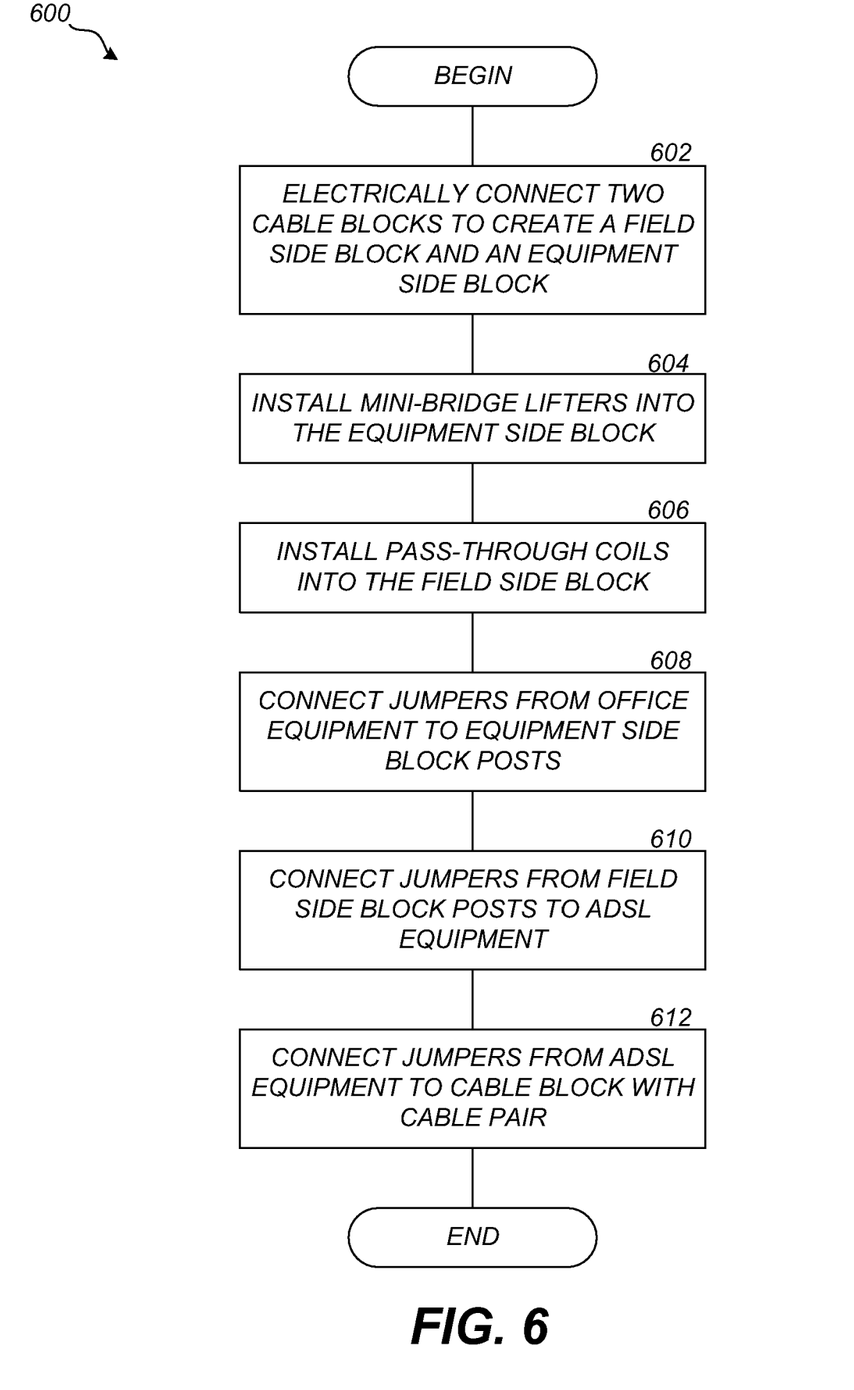
FIG. 6 is a flow diagram illustrating a method for configuring the cable pair isolation system utilizing the mini-bridge lifter block of FIG. 5 according to various embodiments presented herein.

Turning now to FIG. 6, an illustrative routine 600 will be described for configuring the cable pair isolation system 100 utilizing the mini-bridge lifter block 108 of FIG. 5 according to various embodiments presented herein. The routine 600 begins at operation 602, where the technician electrically connects two current cable blocks 104B to create the field-side cable block 502 and the equipment-side cable block 504. As described above, this operation involves soldering the two current cable blocks 104B together using jumpers 112 between the connections typically used for connection to the cable pairs 106.

From operation 602, the routine 600 continues to operation 604, where the technician installs mini-bridge lifters 310 into any number of coil receptacles 506 of the equipment-side cable block 504. There should at least be mini-bridge lifters 310 installed into the coil receptacles 506 that correspond to the pairs of posts 316 that are connected to jumpers 112 extending to the office equipment 102. The routine 600 continues from operation 604 to operation 606, where the technician installs any number of pass-through coils 308 into the coil receptacles 506 of the field-side cable block 502. Again, there should at least be pass-through coils 308 installed into the coil receptacles 506 that correspond to the post pairs 316 that are connected to jumpers 112 extending to the cable block 104.

From operation 606, the routine 600 continues to operation 608, where the technician connects jumpers 112 from the office equipment 102 to available pairs of posts 316 on the equipment-side cable block 504. The routine 600 continues to operation 610, where the technician connects jumpers 112 from the field-side cable block 502 post pairs 316 to the ADSL control equipment 110 if ADSL service is desired. From operation 610, the routine 600 continues to operation 612, where the technician connects jumpers 112 from the ADSL control equipment 110 to the cable block 104 at locations corresponding to the applicable cable pairs 106, and the routine 600 ends. It should be understood that the routine 600 is not limited to the operations described above. Additionally, the operations described above with respect to the routine 600 may be performed in any order without departing from the scope of the present disclosure.

Creating the mini-bridge lifter block 108 from combining two current cable blocks 104B and utilizing the mini-bridge lifters 310 and the pass-through coils 308 in a novel and non-obvious manner allows the technicians to utilize existing equipment in a unique way in order to provide customers with services that may not be otherwise available while decreasing the time and money required to maintain CO equipment. However, according to another embodiment shown in FIG. 7, instead of creating the mini-bridge lifter block 108 out of two current cable blocks 104B, the mini-bridge lifter block 108 may be created to include a single block body 702 that includes an equipment side 704 and a field side 706. The equipment side 704 of the single block body 702 includes a set of post pairs 316 for connecting jumpers 112 that extend to the office equipment 102. Similarly, the field side 706 of the single block body 702 includes a second set of post pairs 316 for connecting jumpers 112 that extend to the cable block 104.

Figure 7:
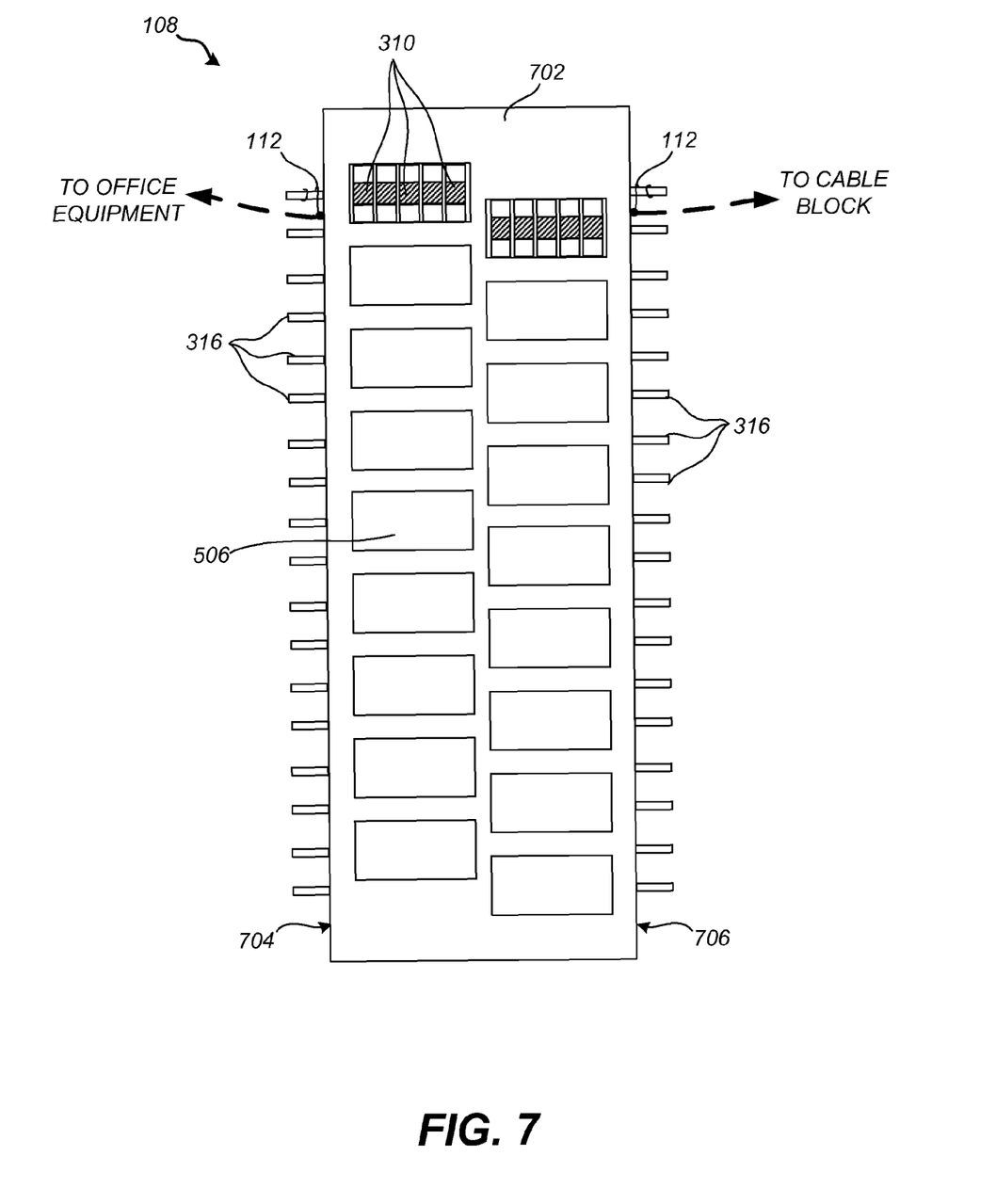
FIG. 7 is a front view of a mini-bridge lifter block having a single block body with equipment side post pairs and field side post pairs according to various embodiments presented herein.

Mini-bridge lifters 310 are installed within coil receptacles 506 in-line between the two sets of post pairs 316. In this embodiment, the single block body 702 would resemble a single current cable block 104B, but with the solder connections for connecting the cable pairs 106 to the rear of the current cable block 104B replaced with a set of post pairs 316. Utilizing this embodiment, pass-through coils 308 would not be required since only a single coil installation location of a coil receptacle 506 would electrically connect a post pair 316 on the equipment side 704 of the single block body 702 with a post pair 316 on the field side 706 of the single block body 702. This single coil installation location would be occupied by the mini-bridge lifter 310. It should be appreciated that in order to install the single block body 702 in-line between the office equipment 102 and the cable block 104, the technician would simply connect the appropriate jumpers 112 from the office equipment 102 and the cable block 104 to corresponding post pairs 316 on the equipment side 704 and on the field side 706 of the single block body 702, respectively, and install the appropriate mini-bridge lifters 310.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A bridge lifting block for isolating cable pairs connected to control equipment via a cable block, the bridge lifting block comprising:
   a first post pair configured for connection to the control equipment via a first jumper connected to the first post pair on one end and to the control equipment on an opposing end;
   a second post pair configured for connection to the cable block directly connected to the cable pairs via a second jumper connected to the second post pair on one end and to the cable block on an opposing end;
   a mini-bridge lifter operative to isolate the cable pairs;
   an electrical conductor connecting the first post pair, the mini-bridge lifter, and the second post pair such that the mini-bridge lifter is positioned in-line between the first post pair and the second post pair;
   an equipment-side cable block comprising the first post pair; and
   a field-side cable block comprising the second post pair, wherein the equipment-side cable block and the field-side cable block are electrically connected via the electrical conductor, the equipment-side cable block comprises a current cable block configured with a first exposed solder point electrically linked to the first post pair, the field-side cable block comprises an identical current cable block configured with a second exposed solder point electrically linked to the second post pair, and the electrical conductor connects the first exposed solder point to the second exposed solder point.

2. The bridge lifting block of claim 1, wherein the mini-bridge lifter is positioned to interrupt the electrical conductor at a position between the first exposed solder point and the first post pair.

3. The bridge lifting block of claim 1, wherein the mini-bridge lifter is installed within the equipment-side cable block and wherein a pass-through coil is installed in the field-side cable block in-line between the mini-bridge lifter and the second post pair.

4. The bridge lifting block of claim 1, wherein at least one of the equipment-side cable block and the field-side cable block comprises a cable block configured to receive a mini-bridge lifter.

5. The bridge lifting block of claim 1, further comprising a single block body, wherein the single block body comprises the first post pair, the second post pair, and the mini-bridge lifter, wherein the mini-bridge lifter is installed between the first post pair and the second post pair such that the mini-bridge lifter interrupts the electrical conductor between the first post pair and the second post pair.

6. The bridge lifting block of claim 1, wherein at least one of the equipment-side cable block and the field-side cable block comprises a cable block configured to receive a mini-bridge lifter.

7. A cable pair isolation apparatus for isolating cable pairs connected to control equipment via a cable block, the cable pair isolation apparatus comprising:
  a first post pair configured for connection to the control equipment via a first jumper connected to the first post pair on a first end and to the control equipment on a second end;
  a second post pair configured for connection to the cable block directly connected to the cable pairs via a second jumper connected to the second post pair on a first end and to the cable block on a second end;
  a mini-bridge lifter operative to isolate the cable pairs;
  an electrical conductor connecting the first post pair, the mini-bridge lifter, and the second post pair such that the mini-bridge lifter is positioned in-line between the first post pair and the second post pair;
  an equipment-side cable block comprising the first post pair; and
  a field-side cable block comprising the second post pair, wherein the equipment-side cable block and the field-side cable block are electrically connected via the electrical conductor, the equipment-side cable block comprises a current cable block configured with a first exposed solder point electrically linked to the first post pair, the field-side cable block comprises an identical current cable block configured with a second exposed solder point electrically linked to the second post pair, and the electrical conductor connects the first exposed solder point to the second exposed solder point.

8. The cable pair isolation apparatus of claim 7, wherein the mini-bridge lifter is positioned to interrupt the electrical conductor at a position between the first exposed solder point and the first post pair.

9. The cable pair isolation apparatus of claim 7, wherein the mini-bridge lifter is installed within the equipment-side cable block and wherein a pass-through coil is installed in the field-side cable block in-line between the mini-bridge lifter and the second post pair.

10. The cable pair isolation apparatus of claim 7, further comprising a single block body, wherein the single block body comprises the first post pair, the second post pair, and the mini-bridge lifter, wherein the mini-bridge lifter is installed between the first post pair and the second post pair such that the mini-bridge lifter interrupts the electrical conductor between the first post pair and the second post pair.

11. The cable pair isolation apparatus of claim 7, wherein at least one of the equipment-side cable block and the field-side cable block comprises a cable block configured to receive a mini-bridge lifter.

12. The cable pair isolation apparatus of claim 7, wherein at least one of the equipment-side cable block and the field-side cable block comprises a cable block configured not to receive a mini-bridge lifter.

\* \* \* \* \*